Feb. 28, 1967  W. B. ADAM  3,307,183
CONICAL SCAN RADAR SYSTEM AND ANTENNA
Filed March 11, 1957  2 Sheets-Sheet 1
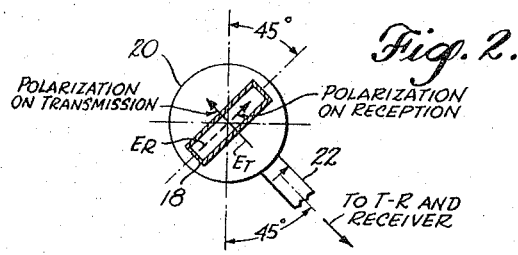
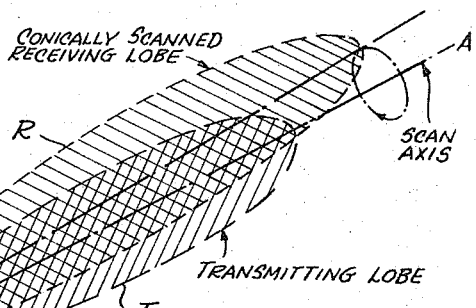
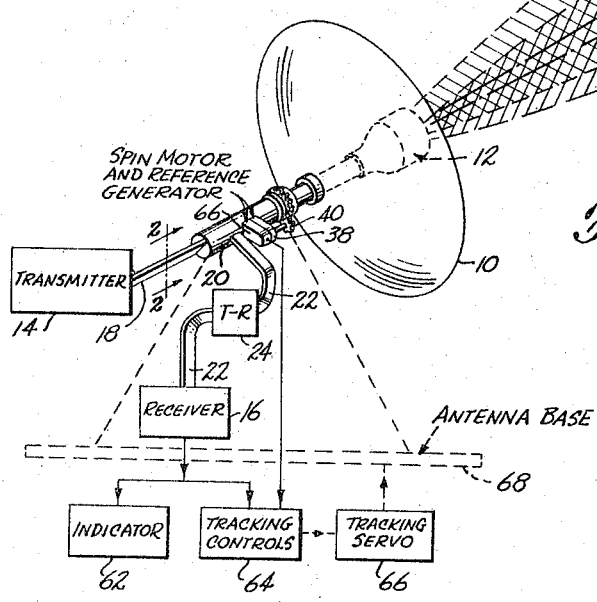
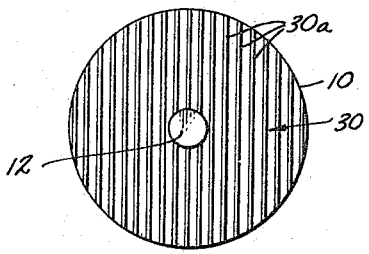
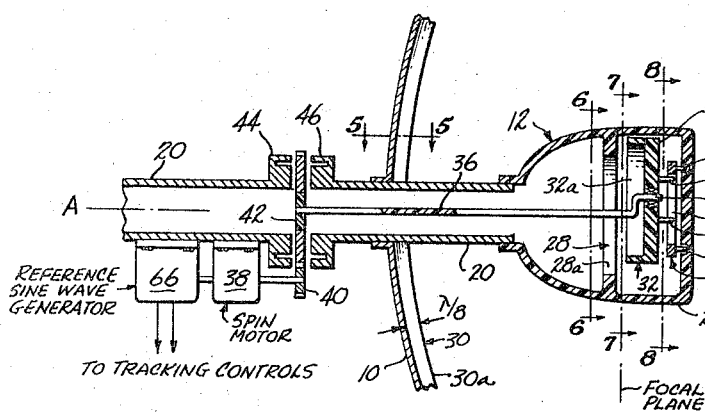
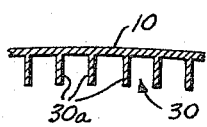
INVENTOR.
WILLIAM B. ADAM
BY
Reynolds, Beach & Christensen
ATTORNEYS

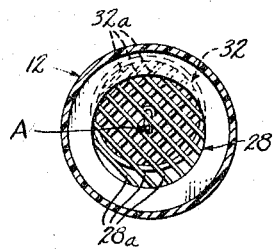
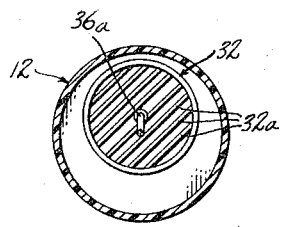
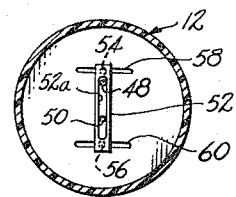
Fig. 6.   Fig. 7.   Fig. 8.
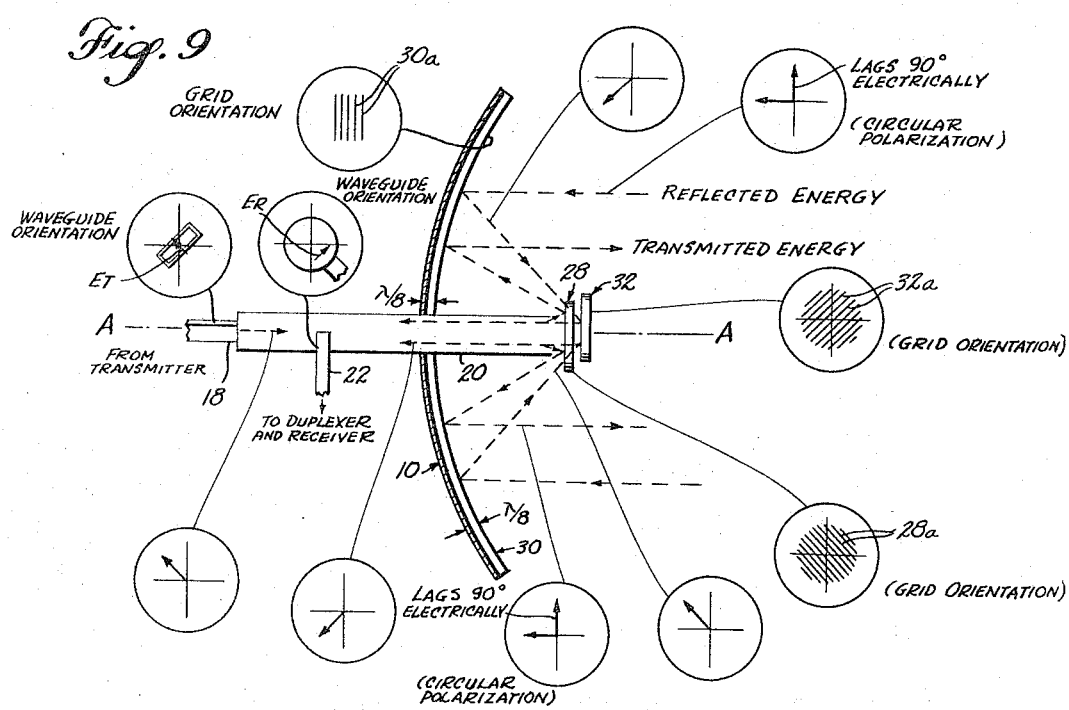
VECTOR POLARIZATION AND ELEMENT ORIENTATION DIAGRAM
(VECTORS VIEWED ON AXIS A FROM TRANSMITTER END)
INVENTOR.
WILLIAM B. ADAM
BY
ATTORNEYS United States Patent Office 3,307,183
Patented Feb. 28, 1967

3,307,183
CONICAL SCAN RADAR SYSTEM
AND ANTENNA
William B. Adam, Seattle, Wash., assignor to Boeing Airplane Company, Seattle, Wash., a corporation of Delaware
Filed Mar. 11, 1957, Ser. No. 645,372
7 Claims. (Cl. 343—16)

This invention relates to electromagnetic wave energy systems of the radar type for directionally locating or tracking remote objects by electromagnetic wave energy reflections therefrom, and more specifically concerns a modified type of conical scan direction finding or tracking radar. The invention is herein illustratively described by reference to its presently prefered form and application; however, it will be recognized that certain modifications and changes therein may be made without departing from the essentials involved.

In the conventional conical scan automatic angle tracking or direction finding radar the main lobe of the antenna radiation pattern for transmission and reception is canted slightly in relation to a directional axis and is revolved at predetermined speed about that axis. Energy reflections from the object being tracked are modulated at the conical scan frequency at a relative amplitude and phasing according to the amount and sense of misdirection of the scan axis in relation to the object. By comparing the modulation envelope with a reference sine wave directional error may be indicated or may be corrected.

One difficulty with such a system when used against enemy aircraft is the comparative ease of producing an effective jamming signal. The required characteristics of the jamming signal at the enemy aircraft may be determined by detecting the carrier wave frequency and the conical scan modulation frequency of the tracking radar. On the basis of this information, a countermeasure or jamming transmitter is set into operation at the same carrier wave frequency and modulated at the conical scan frequency of the tracking radar, but with the modulation imposed at a different relative phasing. The tracking radar then wanders from the true target direction in accordance with the magnitude and phasing of the jamming wave modulation.

An object of the present invention is to provide a reliable conical scan type radar which is substantially invulnerable to the above-mentioned type of jamming. This objective is achieved in accordance with the invention by employing antenna means which presents a conically scanned reeciving pattern but a nonscanned or steadily directed transmission pattern, whereby tell-tale conical scan modulation is completely eliminated from the radiant energy which may be detected at the enemy aircraft. More specifically it is an object herein to provide a single aperture radar system and antenna, wherein a single parabolic or other direction reflector and preferably a single wave guide feeding energy to the reflector and receiving energy from the reflector may be used, thereby to satisfy the objectives of compactness, reliability, simplicity and accuracy of operation. An important object is to utilize as much as practical the full gain or aperture of the antenna reflector for both transmission and reception.

Another object of the invention is the provision of such a radar which transmits and receives circularly polarized energy, and thereby has the further advantages of mitigating the difficulties associated with reducing the angle tracking error (i.e., "boresight error") rates caused by special shaping of a radome housing the radar, and of comparative insensitivity to polarization-selectivity of reflecting objects.

A secondary object of the invention is the provision of an antenna wave guide connecting arrangement which inherently reduces by a large factor the proportion of transmitted wave energy which can enter the branch guide leading to the receiver, without impairing receptiveness thereof to reflected energy returned to the system. As a result, duplexing problems are simplified with respect to T-R recovery which is a function of the peak powder incident on the T-R tube, and in the case of lower power the T-R tube may be dispensed with altogether. Since in some cases it is unnecessary to employ a T-R unit, it will be evident that the system lends itself to continuous-wave as well as intermittent pulse operation.

Features of the invention reside in the overall combination comprising the improved conical scan system wherein the receiving pattern is rotated while the transmitting pattern is steadily directed in relation to the scan axis; in the novel antenna arrangement for converting from plane polarization into a directional beam of circular polarization for transmission, and, on reception, from circular polarization back into plane polarization of a different direction of polarization than on transmission; in the polarization-selective duplexing wave guide arrangement in combination with said antenna arrangement for effectively isolating the receiver from the antenna and transmitter on transmission and for effectively isolating the transmitter from the antenna and receiver on reception; and in various related combinations and subcombinations as will become evident from the following description by reference to the accompanying drawings.

FIGURE 1 is a simplified perspective view of a conical scan radar as contemplated by the invention.

FIGURE 2 is a simplified sectional view taken on line 2—2 in FIGURE 1 to show certain wave guide arrangements.

FIGURE 3 is a front view of the antenna illustrated in FIGURE 1.

FIGURE 4 is a longitudinal sectional view of the antenna, parts of the reflector being broken away for convenience of illustration.

FIGURE 5 is a fragmentary sectional detail of the reflector, taken on line 5—5 in FIGURE 4.

FIGURE 6 is a sectional detail taken on line 6—6 in FIGURE 4.

FIGURE 7 is a sectional detail taken on line 7—7 in FIGURE 4.

FIGURE 8 is a sectional detail taken on line 8—8 in FIGURE 4.

FIGURE 9 is a diagrammatic illustration of the antenna system to show relative polarization of electric field vectors at different points in the system and related orientation of wave guides and polarization sensitive grids embodied in the system.

Referring to the drawings, the principal energy-directing antenna element comprises the paraboloid reflector 10 having a conductive surface on its concave side. The diameter of this reflector in wave lengths determines the angular resolution or beam width of the radar. At or near the focal point of paraboloid 10 is mounted a radiation unit 12 by which the microwave energy from transmitter 14 is directed against the concave side of the paraboloid for concentration into a beam T outwardly directed along scan axis A coinciding with the paraboloid axis. Some of the energy reflected from a remote object in the transmitted beam is intercepted by paraboloid 10 and reflected by it back into the radiation or feed unit 12. Such energy is then conducted to a receiver 16.

Transmitted energy passes from transmitter 14, first through a rectangular hollow wave guide 18 then through a circular hollow wave guide 20 before reaching radiation unit 12. The rectangular wave guide is coupled into the circular wave guide to excite the fundamental mode of transmitted energy propagation therein with E vector orientation ($E_T$) as shown in FIGURE 2. Circular guide 20 extends through an aperture in paraboloid 10 along the axis A. Received energy passes from radiation unit 12, first through the circular wave guide 20 then through a rectangular wave guide 22 to reach receiver 16. The rectangular guide 22 is coupled to the circular guide to be excited in its fundamental mode by received energy propagation in the circular guide which is polarized at right angles to the polarization therein on transmission. A relationship of the wave guides yielding this result is shown in FIGURE 2, wherein E vector orientation ($E_R$) for received energy in the circular guide required to excite rectangular guide 22 is illustrated. It will be observed that the mode of coupling the two rectangular wave guides to the circular guide precludes any material proportion of transmitted energy from entering the receiving guide 22 and further assures that if appropriate well known impedance matching techniques are employed practically all of the received energy when polarized as in FIGURE 2 will pass through guide 22 to the receiver 16.

If required, a T-R box 24 may be interposed in receiving wave guide 22 to increase the degree of isolation of the receiver during energy transmission. This T-R unit may be of any suitable or conventional type and because it is required to reflect relatively low energy levels it may be of comparatively broadband design and will have a long life.

Radiation unit 12 comprises a dielectric envelope 26 mounted on the open end of circular wave guide 20. A reflective grid 28, comprising parallel conductive strips 28a supported by the envelope 26, is positioned transversely to axis A directly in the path of radiation from wave guide 20. The grid strips 28a are oriented parallel to the direction of E vector ($E_T$) polarization of transmitted wave energy and are spaced apart successively in the grid formation by a maximum distance of the order of a quarter wave length which causes substantially complete deflection of energy of that polarization from the grid and against paraboloid 10. As shown, the grid 28 is of circular outline form centered on axis A, so that illumination of the paraboloid by reflection of transmitted energy from the grid is substantially uniform and as if from a source located at the paraboloid focal point. The result is a transmitted beam T symmetrical about scan axis A.

The transmitted beam T is given circular polarization. This is carried out by mounting on the concave face of the paraboloid a grid of parallel conductive strips 30a which are oriented at 45 degrees to the E vector polarization of transmitted wave energy reflected from grid 28. The strips 30a are spaced closely enough together in terms of a wave length that voltage field components parallel to the grid strips are substantially completely reflected by the grid. By making the strips an eighth of a wave length wide as measured perpendicularly to the paraboloid surface, voltage field components perpendicular to the grid strips will propagate through the grid to be reflected by the paraboloid surface proper and recombine at 90 electrical degrees relative phasing with energy reflected directly from the grid. As a result the electromagnetic wave energy field in beam T is made up of orthogonally polarized components electrically phased at 90 degrees from each other. Transmission beam T is therefore circularly polarized.

Energy reflected back to paraboloid 10 from a remote object is also circularly polarized, and in the same sense as the transmitted energy. When this echo energy reaches the grid 30 one component is reflected directly thereby, whereas the orthogonally related component passes through the grid to be reflected by the paraboloid proper. The components recombine into a propagating field, directed toward radiation unit 12, said field having plane polarization oriented orthogonally in relation to the direction of polarization of the originally transmitted energy reflected by grid 28. Because of its polarization, received energy reflected by paraboloid 10 and grid 30 passes without appreciable reflection through grid 28.

A second circular grid 32 of parallel conductive strips 32a, similar to grid 28, is mounted just behind grid 28 and parallel to the latter but offset slightly from the axis A. The conductive strips 32a are oriented perpendicularly to strips 28a so that reflected energy passing perpendicularly through strips 28a is reflected back into wave guide 20 by grid 32. Grids 28 and 32 are located as close as possible to the focal plane of paraboloid 10.

Grid strips 32a are supported by a disk 34 of dielectric material having a central bore which rotationally receives and is supported by the offset portion 36a of rotary shaft 36. This shaft, extending in and along the axis of circular guide 20, is rotated by a spin motor 38 acting through a pinion 40 and gear 42. The shaft 36 is of dielectric material as is the central portion of gear 42 within the internal circumference of circular guide 20, so as to interfere to a minimum extent with the field pattern in this wave guide. The surrounding outer or peripheral portion of gear 42, of conductive material, is received between the opposing quarter wave length choke type coupling flanges 44 and 46 of well known design, so that there is no objectionable electrical discontinuity in the circular wave guide 20 at the gap which accommodates gear 42.

As shaft 36 rotates, the offset grid 32 carried by disk 34 moves with it about axis A. However, disk 34 is free to rotate about offset or crank shaft 36a. On the back side of the disk a pair of laterally spaced slide pins 48 and 50 project slidably into a slot 52a of a guide member 52. On the ends of this guide member a pair of laterally spaced slide pins 54 and 56 project slidably into parallel guide slots 58 and 60 formed in the end wall of the envelope 12 and extending perpendicularly to the slot 52a. This arrangement of slide pins and guide slots respectively engaged thereby permits the offset disk 34 to move orbitally about axis A but prevents it from rotating. Thus the grid 32 executes a form of "nutation" about axis A as shaft 36 rotates, the conductive strips 32a thereof remaining constantly oriented during such motion.

The effect of offsetting circular reflective grid 32 is to cant the main lob R of the antenna pattern for reception of energy reflected from remote objects in transmitted beam T. The effect of nutation of this grid is to rotate the reception pattern in conical scan fashion about scan axis A so as to impose a modulation envelope on the recurring impulses of reflected energy having an amplitude and phasing in the grid rotation cycle corresponding to the amount and sense of deviation of a reflecting object from the scan axis.

In a suitable or conventional manner the receiver detects the modulation envelope of the reflected energy impulses for application to an indicator 62, or to tracking controls 64, or to both. A reference sine wave produced by a generator 66 driven by motor 38 at conical scan frequency is also applied to tracking controls 64 for electrical comparison with the detected modulation envelope wave. From this comparison angle tracking error signals are generated in conventional or suitable manner for energizing the tracking servo 66. The latter is thus energized in a manner to move the antenna base 68 in azimuth and elevation for correcting the error. The process of correction is ordinarily a continuous one so as to maintain scan axis A directed constantly toward a desired target with minimum angular error.

FIGURE 9 illustrates the various polarizations of fields and related orientations of elements involved in the operation of the system. From this figure primarily it will be evident, in summary, that the system operates in the following described manner. Energy from the transmitter enters circular wave guide 20 with predetermined plane polarization oriented parallel to the strips of the stationary reflecting grid 28, from which it is reflected with unchanged polarization toward paraboloid 10. Paraboloid grid strips 30a are oriented at 45 degrees to the direction of polarization of this energy and are one-eighth of a wave length deep. Consequently, transmitted beam T is circularly polarized. Such beam is directed symmetrically along axis A. Receiving beam R is canted at a constant angle in relation to axis A and is rotated about said axis at constant speed, by virtue of the offset and nutational movement of grid 32. Received circularly polarized energy is restored to plane polarization upon reflection from grid-covered paraboloid 10. The direction of polarization thereof is perpendicular to the grid strips 28, so that this energy passes through grid 28 and is reflected by grid 32 back through grid 28 and into wave guide 20. In the wave guide the returning energy enters rectangular wave guide 22 due to the polarity-selective coupling thereof to the circular wave guide. The modulation envelope of received energy resulting from conical scan of the receiving beam pattern R is compared with a reference wave from generator 66 to control an indicator 62 or tracking servo 66, or both, as desired.

Having described the improved direction finding radar by reference to the presently preferred form thereof it will be evident that certain changes and modifications therein with respect to details are possible within the scope of the novel principles involved. The term "radar" is used herein in its broad sense to include electromagnetic wave energy systems of the type transmitting energy toward a reflecting object and utilizing resultant echo energy reflected from the object, whether or not pulse operation or C-W operation is involved, and whether or not the system is also capable of determing range to the object.

I claim as my invention:

1. A conical scan direction finding radar system comprising a transmitter of electromagnetic wave energy, a receiver of such transmitted electromagnetic wave energy reflected from a remote object, means operated by the receiver in accordance with conical scan modulation carried by such received electromagnetic wave energy, representing directional error of the conical scan axis in relation to the reflecting object, a wave energy reflector of generally paraboloidal form, means connected to said transmitter and including a transmitting antenna radiation element positioned in the vicinity of the focal point of said reflector, adapted for directing transmitted electromagnetic wave energy therefrom against said reflector from the vicinity of the focal point of said reflector and with one polarization, thereby to form a transmitted wave energy beam directed along the axis of said paraboloidal reflector, means connected to said receiver and including a receiving antenna radiation element positioned in the vicinity of the focal point of said reflector but offset from said axis for directing electromagnetic wave energy from said reflector to said receiver selectively with polarization differing materially from the polarization of said transmitted wave energy, means to revolve said receiving antenna radiation element about said axis while maintaining constant the polarization orientation selectivity thereof, and means interposed in the path of wave energy propagating from said transmitting antenna element and returning to said receiving antenna element upon reflection from the remote object, said means being adapted to change the polarization of such propagating energy from the first-mentioned polarization to the second.

2. A conical scan direction finding radar system comprising a transmitter of electromagnetic wave energy, a receiver of such transmitted electromagnetic wave energy reflected from a remote object, means operated by the receiver in accordance with conical scan modulation carried by such received electromagnetic wave energy, representing directional error of the conical scan axis in relation to the reflecting object, a wave energy reflector of generally paraboloidal form, means connected to said transmitter and including a transmitting antenna radiation element positioned in the vicinity of the focal point of said reflector, adapted for direction transmitted electromagnetic wave energy therefrom against said reflector from the vicinity of the focal point of said reflector and with plane polarization of one orientation, thereby to form a transmitted wave energy beam directed along the axis of said paraboloidal reflector, means connected to said receiver and including a receiving antenna radiation element positioned in the vicinity of the focal point of said reflector but offset from said axis for directing electromagnetic wave energy from said reflector to said receiver selectively with plane polarization of an orientation differing materially from the polarization of said transmitted wave energy, means to revolve said receiving antenna radiation element about said axis while maintaining constant the polarization orientation selectivity thereof, and means interposed in the path of wave energy propagating from said transmitting antenna element and returning to said receiving antenna element upon reflection from the remote object, said means being adapted to rotate the plane of polarization of such propagating energy from the first-mentioned orientation to the second.

3. The system defined in claim 2, wherein the last-mentioned means comprises means superposed on the reflector and adapted to convert plane polarized energy from the transmitting antenna element into circularly polarized energy, and circularly polarized energy received at the reflector from the reflecting object back into plane polarized energy oriented at 90 degrees to the first-mentioned plane polarized energy, for reflection thereby to the receiving antenna element.

4. The system defined in claim 2, wherein the last-mentioned means comprises a reflective grid of parallel conductive strips superposed on the reflector and of such relative spacing, and of such width, measured parallel to the reflector axis, to occupy substantially one eighth of a space-wave length of the energy incident on said grid and reflector, thereby to convert plane polarized energy from the transmitting antenna element into circularly polarized energy, and circularly polarized energy received at the reflector from the reflecting object back into plane polarized energy oriented at 90 degrees to the first-mentioned plane polarized energy, for reflection thereby to the receiving antenna element.

5. The system defined in claim 3, wherein the transmitting and receiving antenna radiation elements comprise parallel reflective grids comprising parallel conductive strips oriented in one grid perpendicularly to those in the other, said grids being disposed perpendicularly to the paraboloid axis.

6. The system defined in claim 5, wherein the means connected to the transmitter and the means connected to the receiver comprise in common a length of wave guide of circular cross-sectional form having an open end directed along the axis toward the radiation element grids, and wherein the means connected to the transmitter further comprises a separate transmitting wave guide coupled with the circular wave guide to direct energy into the same selectively with plane polarization, and the means connected to the receiver further comprises a separate receiving wave guide coupled to the circular wave guide to receive energy therefrom selectively with plane polarization oriented substantially at 90 degrees to that of the transmitting wave guide.

7. A conical scan direction finding radar system comprising a transmitter of electromagnetic wave energy, a receiver of such transmitted electromagnetic wave energy reflected from a remote object, means operated by the receiver in accordance with conical scan modulation carried by such received electromagnetic wave energy, representing directional error of the conical scan axis in relation to the reflecting object, antenna means adapted to form a directional electromagnetic energy radiation beam pattern directed along an axis, means connected to said transmitter and including a transmitting antenna radiation element adapted for directing transmitted electromagnetic wave energy therefrom to said antenna means with one polarization, thereby to form a transmitted wave energy beam directed along said axis, means connected to said receiver and including a receiving antenna radiation element offset from said transmitting antenna radiation element, adapted to receive remote-object-reflected electromagnetic wave energy from said antenna means with a receiving pattern canted slightly in relation to said axis by virtue of said offset, said receiving antenna element being selective to polarization differing materially from the polarization of said transmitted wave energy, means to revolve said receiving antenna radiation element about said axis while maintaining constant the polarization orientation selectivity thereof, and means interposed in the path of wave energy propagating from said transmitting antenna element and returning to said receiving antenna element upon reflection from the remote object, said means being adapted to change the polarization of such propagating energy from the first-mentioned polarization to the second.

No references cited.

CHESTER L. JUSTUS, *Primary Examiner.*

FREDERICK M. STRADER, RODNEY D. BENNETT,
*Examiners.*

R. A. KUYPERS, *Assistant Examiner.*